United States Patent Office 3,649,580
Patented Mar. 14, 1972

3,649,580
TALL OIL PITCH TACKIFIERS IN ETHYLENE-PROPYLENE TERPOLYMER RUBBER
Herbert George Arlt, Jr., Ridgefield, Conn., and Edward Helmut Sheers, Flushing, N.Y., assignors to Arizona Chemical Company, New York, N.Y.
No Drawing. Filed Mar. 13, 1969, Ser. No. 807,086
Int. Cl. C08d 9/12
U.S. Cl. 260—27                                    4 Claims

ABSTRACT OF THE DISCLOSURE

Tall oil pitch containing at least 75% and preferably 80% to 100% of nonvolatile material is incorporated into ethylene-propylene terpolymer rubber, preferably as a 40% to 90% solution in rubber processing oil.

---

The present invention relates to synthetic rubber compositions of improved tack and more particularly to ethylene-propylene synthetic rubber compositions and especially ethylene-propylene-terpolymer compositions of improved tack. Further, the present invention relates to a process for producing such synthetic rubber compositions of improved tack and to new tackifying compositions for use therein.

"Building tack" is the surface property of natural rubber which enables two pieces of unvulcanized stock to adhere when brought into contact under pressure. This phenomenon is specific between two pieces of natural rubber since such stock will not adhere to other substances such as metal, glass or wood. Bonds of this type ("building tack") are established by diffusion of chain ends and segments into each other. To increase building tack one must therefore add a tackifier which allows the rubber polymer chain ends greater mobility so that they may entangle.

Ethylene-propylene rubbers are lacking in this property which is required in many fabricating operations. The building tack of these rubbers, i.e., ethylene-propylene rubber and ethylene-propylene terpolymer rubber, can be developed nevertheless by the addition of natural rubber or various other agents or tackifiers to the synthetic rubber to impart this property thereto. Electron microscopy applied to tackified and untackified formulations shows that balanced incompatibility accomplished by tackifier addition leads to plasticized nodules which lead to enhanced tack.

Typically in the preparation of rubber goods from ethylene-propylene rubber and ethylene-propylene terpolymer rubber, an agent or tackifier is added to produce tack in the uncured stock so that various plies, possibly of different composition and re-enforcing materials such as cords, can be pressed or plied together. The tackifier enables the plies to ahere together so that the assembly will display sufficient strength to be handled prior to curing.

A tackifier of this type in order to be truly satisfactory in addition to providing tackiness to the various plies before cure should not impair to any significant degree the physical properties of the cured rubber, as for example its tensile strength, modulus or elongation properties. Especially important with ethylene-propylene terpolymer rubber, the tackifier should not change the excellent aging characteristics since this is the outstanding physical characteristic of ethylene-propylene terpolymer rubbers.

Accordingly, it is an object of the present invention to provide tacky ethylene-propylene uncured rubber compositions, including ethylene-propylene terpolymer rubber stock, in which the tackifier does not significantly adversely affect the physical characteristics of the cured rubber resulting therefrom.

A further object of the present invention is to provide an ethylene-propylene uncured rubber composition, including ethylene-propylene terpolymer rubber stock, characterized in its uncured state by tack through the presence of relatively small but effective tackifying amounts of novel tackifiers.

A still further object of the present invention is to provide ethylene-propylene rubber compositions, including ethylene-propylene terpolymer rubber stock, characterized in the uncured state by tack and in the cured state as being essentially tack-free.

These and other objects and advantages of the invention will be further described and illustrated in the following description and examples when taken with the appended claims.

We have discovered that tall oil pitches which have a critically high content of non-volatiles are good tackifiers for uncured ethylene-propylene copolymer and terpolymer rubbers when incorporated therein in relatively small but effective amounts, which are hereinafter sometimes designated as tackifying amounts. Our invention, in its broadest aspects, therefore consists in the provision of such rubbers containing these tall oil pitches as tackifiers together with methods for their preparation.

Rubber processing oils are hydrocarbon oils of relatively low viscosity that are commonly used in compounding ethylene-propylene rubbers. They may be predominantly paraffinic, naphthenic or aromatic in character. We have also discovered that the above-described tackifying tall oil pitches of high non-volatile content are soluble in these oils, and that the resulting solutions have even better tack-imparting properties for uncured ethylene-propylene terpolymer rubber compositions. Our invention therefore includes these solutions as new tackifying compositions and processes wherein they are incorporated into ethylene-propylene terpolymer rubber compositions in tackifying amounts.

The ethylene-propylene polymers contemplated for use in the rubber compositions of this invention may be ethylene-propylene rubber, including ethylene-propylene terpolymer rubber, the latter being characterized by the presence of residual unsaturation achieved through the presence of a third monomer component and through the presence of which the terpolymer may be vulcanized. Fundamentally, ethylene-propylene rubbers are materials prepared by polymerization of mixtures of ethylene and propylene or ethylene-propylene in admixture with a small amount of a third monomer of a diene type, with active metal catalysts. U.S. Pat. Nos. 2,983,714; 3,081,276; 3,086,964; 3,112,297 and 3,127,379 are typical of the patents describing ethylene-propylene rubber, while U.S. Pat. Nos. 2,975,159 and 3,102,876 are typical of patents describing ethylene-propylene terpolymers. Typical ethylene-propylene terpolymer rubber includes products sold under various designations comprised of ethylene-propylene and a diene monomer such as dicyclopentadiene, divinylbenzene or 1,4-hexadiene. Typical of the ethylene-propylene terpolymers, elastomer types would be an ethylene-propylene - 1,4 - hexadiene rubber prepared by the methods and catalyst systems described in U.S. Pat. No. 2,975,159 and U.S. Pat. No. 3,102,876 using the ratio of monomers of 83:14:3. The ratio of the diene termonomer may be varied from 2–5% dependent on the cure system envisioned and the crosslink density required in curing. The tackifying action of resin-type compounds on these rubbers is described in U.S. Pat. No. 3,402,140.

The tall oil pitches of high non-volatile content, which are those useful as ethylene-propylene copolymer rubber tackifiers, are obtained in the following manner.

Tall oil, obtained by acidifying black liquor soap, contains about 45 percent of fatty acids, about 45 percent of rosin acids and about 10 percent of a mixture of lignin residues, lignoceryl-type alcohols, sitosterol-type sterols, and color bodies and other unsaponifiables. When this tall oil is processed by vacuum distillation, it is first preheated and injected with steam into a pitch stripper in which a mixture of the non-volatile and high-boiling materials becomes converted into pitch as most of the fatty acids, rosin acids and other more volatile materials are vaporized.

The temperature of the liquid phase in the pitch stripper may be 250°–280° C. or higher, depending on pressure and other factors. Some of the chemical reactions that may occur at these temperatures are described in Kirk-Othmer, "Encyclopedia of Chemical Technology," vol. 13, page 575. Alcohols and sterols are esterified and remain in the pitch along with lignin residues, polymerized unsaturated acids and high-boiling unsaponifiables having molecular weights above about 500. The tall oil pitches that constitute the source material for the new tackifiers of the present invention are therefore composed principally of the polymerization and partial decomposition products of the rosin acids and their esters and of the fatty acids and their esters together with high-boiling unsaponifiable matter including lignin residues. They usually have acid numbers within the range of about 30–70, which corresponds to a calculated content of about 24% to 40% of fatty acid and rosin acid materials.

It will be understood that these tall oil pitches may vary in their content of materials that can be removed by further distillation. We have found, however, that they normally contain at least 50 percent of non-volatiles, and it is these which constitute the principal active ingredient of the new tackifiers of our invention. Non-volatiles are defined as the material which remains when the tall oil pitch is stripped by heating at 275° C. under 0.5 to 1.0 mm. of mercury pressure. We have encountered tall oil pitches which leave from 75 percent to 90 percent or more of their weight as residue when tested by this procedure, and these may be used directly as tackifiers for ethylene-propylene terpolymer rubbers. Most tall oil pitches, however, have a higher volatile content, and these must be stripped at least until their residues contain no more than 25 percent and preferably not more than about 20 percent to 10 percent by weight of material that can be removed by evaporation at 275° C. under 0.5–1.0 mm. of mercury pressure. Stated differently, the pitches which are useful tackifiers for ethylene-propylene terpolymer rubber must contain at least 75% and preferably 80–90% or more of non-volatiles.

We have obtained residues that contain 100% of material that is non-volatile at 275° C. and 0.5–1 mm. of mercury. Typical of these is the material shown in Example 1. They impart good tack to uncured ethylene-propylene terpolymer rubber when incorporated at 5 and 10 p.h.r., but the residue of Example 2 (which contained 9 percent of volatiles) gave almost as good results. Good tack was also obtained with the residue of Example 3, which contained almost 17 percent of volatiles. These proportions of volatiles are therefore well tolerated in the tackifiers of our invention. Example 4 shows, however, that the adhesion-imparting properties of the non-volatiles are reduced materially when the content of volatiles increases to 23 percent, and these properties are reduced still further as the upper limit of 25 percent is approached.

We have found that the hardness of tall oil pitches is a reliable measure of their non-volatile content and effectiveness as tackifiers for ethylene-propylene terpolymer rubbers. This can be measured accurately by a modification of the A.S.T.M. Designation D217–67T test that was originally developed for lubricating greases, the sample under test being maintained at 0° C. instead of the usual 25° C. In this test a standard penetrating cone is allowed to penetrate the tall oil pitch for five seconds, after which the depth attained is measured and is reported in tenths of a millimeter. When the penetration is not more than 20 (i.e., 2 mm.) and preferably in the range of about 15–18 the material is a good tackifier for ethylenepropylene terpolymer rubbers.

The tackifier is normally employed in an amount of from 1% to 20%, preferably between 1½ and about 15% based on the weight of the ethylene-propylene terpolymer rubber present in the rubber formulation. In most cases such tackifiers have been employed with uniformly good success in amounts of from about 5 to about 10% based on the weight of the ethylene-propylene rubber.

As noted above, the tackifier must be compatible with the ethylene-propylene rubber. By compatible, as that term is employed herein, it is meant that the tackifier must be capable of wetting the rubber and other important components of a rubber formulation such as carbon black and exhibit to some extent partial co-solubility in the rubber. The apparent major function of the tackifier is to plasticize chain ends and so increase their mobility, that on pressing together two tackified surfaces for a short time, rubber polymer chain ends may entangle and comingle and create a strong bond at least in numerous scattered sites across the surface. For this, controlled compatibility is required.

As is well known in the rubber formulating art, the rubber compositions may contain various pigments, fillers, antioxidants, carbon black, sulfur and other formulation or curing aids.

The compounding of a solid tackifier with a rubber processing oil produces a material which has a reduced viscosity at elevated temperature. Consequently, the solid tackifier may be more rapidly and completely combined with the ethylene-propylene rubber formulation. Additional benefit is derived by dissolving the tall oil pitch tackifiers of this invention in a rubber process oil, since tackifier levels may be reduced, the tackifier is incorporated in the rubber formulation more rapidly and approximately the same level of tack is achieved. Preferred solutions are those which contain about 40 to 90 parts by weight of the tall oil pitch, which may contain from 75–80% up to about 100% of material that is non-volatile when heated at 275° C. under 0.5–1.0 mm. of mercury pressure, dissolved in from 60 to 10 parts of the rubber processing oil.

Since rubber processing oils are normally used to extend ethylene-propylene terpolymer rubbers, are inexpensive and do not significantly affect physical properties at low levels of addition an economic advantage arises from their use. Since rubber processing oils are normal components of an ethylene-propylene rubber formulation, there is no objection to their use as solvents for the tall oil pitch. The choice of a paraffinic, naphthenic, or aromatic processing oil is usually based on compatibility with the rubber formulation and on oxidation and color stability required by the end use of the rubber product. In this case an oil that was about 40 percent paraffinic, 40 percent naphthenic and 20 percent aromatic demonstrated the greatest overall utility.

The tackifier may be included in the rubber formulation by mixing in a master batch thereof usually on a rubber mill, again in accordance with procedures well known to those skilled in the art.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

A dark brown tall oil pitch having a softening point of about 35° to about 40° C., as determined by the Ring and Ball Method (A.S.T.M.) E-28–58T) and an acid number of 50 was used. In a Pfaudler wiped film evaporator having a heat transfer surface area of 100 square feet a 25-ton batch of the pitch was distilled at 275° C. and 0.5–1.0 mm. of mercury pressure. Distillation was continued until all of the material was removed that was volatile under these conditions. There remained 12.5 tons or 50 percent of non-volatile material. Analysis of a sample cooled to 0° C. showed that its hardness at that temperature was 15.5 (i.e., a penetration of 1.55 millimeters) when tested by the A.S.T.M. D217–67T cone penetration method.

A portion of the stripped tall oil pitch weighing 250 pounds was pumped while still hot into a tank containing 64 gallons of a naphthenic rubber processing oil having an SUS viscosity at 100° F. of 2079, a flash point of 445° F., and an aniline point of 174° F. This oil contained about 39% of naphthenic hydrocarbons, 41% of aliphatic and 20% of aromatic and had an average molecular weight of 400. The pitch dissolved completely in the oil to a solution containing about 60% solids that was found to impart good tack to ethylene-propylene terpolymer rubber compositions when incorporated therein in quantities of about 2 percent to 30 percent or more, based on the weight of the rubber.

EXAMPLE 2

Another portion of the same tall oil pitch starting material was stripped in the same equipment and under the same operating conditions, but only 45 percent was removed as volatiles. This produced a pitch residue containing about 91 percent of non-volatiles and about 9 percent of material volatile at 275° C. and 0.5–1.0 mm. of mercury pressure.

This stripped residue exhibited a cone penetration of 17 when tested at 0° C. It dissolved readily in rubber processing oils to solutions of 40% and 60% solids.

EXAMPLE 3

The procedure of Example 2 was repeated, but only 40 percent of the volatiles were removed. This left a pitch residue containing 16.6 percent of volatiles and 83.4 percent non-volatiles. This residue had a hardness corresponding to a cone penetration of 18 when tested at 0° C. Its solubility in rubber processing oil was the same as that of Example 2.

EXAMPLE 4

The procedure of Example 2 was again repeated, but only 35 percent of the volatiles was removed. The stripped pitch residue therefore contained about 77 percent non-volatiles and 23 percent volatiles. The cone penetration of this residue was 19.5 at 0° C. It was fully soluble in rubber processing oils.

EXAMPLE 5

A master batch of ethylene-propylene terpolymer rubber composition was prepared by milling the following on a rubber mill at 90° F.

| | Parts by wt. |
|---|---|
| Ethylene - propylene - 1,4 - hexadiene (mole ratio 85:20:3) terpolymer rubber | 100 |
| Zinc oxide | 5 |
| Carbon black | 80 |
| Rubber processing oil (68% paraffinic, 28% naphthenic, 4% aromatic) | 40 |
| Sulfur | 1.5 |
| Tetramethylthiouram monosulfide | 1.5 |
| 2-mercapto benzothiazole | 1.5 |

Portions of this batch were then compounded with tackifier to be tested as shown in the following table. In each case the tackifier was added in quantities of 5 and 10 phr. (parts per hundred parts of rubber) as a 60% solution in the rubber processing oil described in Example 1.

TABLE I.—UNCURED EPT COPOLYMER RUBBERS

| | Phr. tackifier | Initial tack | Pull needed to separate 1" x 1" x 6" strips after— | | |
|---|---|---|---|---|---|
| | | | 48 hrs. | 72 hrs. | 96 hrs. |
| Tackifier of Example: | | | | | |
| | None | None | 4 | 4 | 0 |
| 1 | 5 | Good | 12 | 15 | 10 |
| | 10 | do | 15 | 17 | 12 |
| 2 | 5 | Good | 11 | 13 | 8 |
| | 10 | do | 13 | 15 | 10 |
| 3 | 5 | Good | 10 | 13 | 7 |
| | 10 | do | 11 | 13 | 10 |
| 4 | 5 | Poor | 6 | 7 | 4 |
| | 10 | Fair | 4 | 5 | 5 |
| Unstripped pitch [1] | 5 | Poor | 4 | 4 | 0 |
| | 10 | do | 4 | 3 | 0 |
| Phenolic resin | 5 | Fair | 7 | 8 | 3 |
| | 10 | do | 5 | 5 | 6 |

[1] Starting material of Example 1.

EXAMPLE 6

The formulations of Example 5 which contained 10 phr. of the tackifiers of Examples 1 and 2 were cured for 30 minutes at 307° F. and their critical physical properties were determined. Samples of the cured rubbers were then aged in an oven at 250° F. for five days and were tested. The results of these tests are shown in Tables 2 and 3 along with control samples of the same rubber containing no tackifiers and also with samples containing 10 phr. of a commercial phenolic resin tackifier of the type described in column 4 lines 6–21 of U.S. Pat. No. 3,402,140.

In these tables tensile strength is defined as the force per unit of the original cross-sectional area which is applied at the time of rupture of the dumbbell test specimen. It is calculated by dividing the breaking force in pounds by the cross section of the unstressed specimen in square inches.

Modulus of stress is used to express the amount of pull in pounds per square inch required to stretch the test specimen to a given elongation. It expresses resistance to extension in the vulcanizate.

The term elongation is used to describe the ability of the rubber to stretch without breaking. To describe this property as measured, it is more accurate to refer to it as "ultimate elongation," since its value, expressed as percent of the original length, is taken at the moment of rupture.

Hardness as applied to rubber implies resistance to indentation. It is expressed as a number on the scale of the instrument by which it is measured. It is an important property, frequently used in rubber specifications along with the tensile properties to which it is somewhat related. ASTM designations $D_{314-52T}$, $D_{531-49}$ and $D_{676-55T}$ describe hardness testing methods by the most commonly used.

TABLE II.—SAMPLES CURED 30 MINUTES AT 307° F.

| | Control [1] | Ex. 1 | Ex. 2 | Phenolic resin |
|---|---|---|---|---|
| Tensile strength | 2,430 | 2,320 | 2,280 | 2,150 |
| Modulus 100% | 290 | 130 | 160 | 170 |
| Modulus 200% | 820 | 370 | 380 | 840 |
| Modulus 300% | 1,450 | 750 | 820 | 1,000 |
| Ultimate elongation, percent | 470 | 710 | 630 | 590 |
| Hardness | 61 | 55 | 58 | 53 |

[1] No tackifier.

TABLE III.—CURED SAMPLES AGED 5 DAYS AT 250° F.

|  | Control | Ex. 1 | Ex. 2 | Phenolic resin |
|---|---|---|---|---|
| Tensile strength | 2,130 | 2,400 | 2,350 | 1,900 |
| Modulus 100% | 520 | 260 | 340 | |
| Modulus 200% | 1,680 | 950 | 1,070 | |
| Modulus 300% | | 1,710 | 1,880 | |
| Ultimate elongation, percent | 260 | 460 | 410 | |

These test results show that the tall oil pitch tackifiers do not seriously impair the physical properties of representative ethylene-propylene terpolymer rubbers, even when as much as 10 percent of the tackifier is incorporated therein.

What we claim is:

1. An uncured ethylene-propylene terpolymer rubber composition comprising an ethylene-propylene terpolymer rubber and as a tackifier from about 1% to 20% by weight of the terpolymer rubber of a tall oil pitch containing at least 75 percent by weight of material that is non-volatile when heated at 275° C. under 0.5–1.0 mm. of mercury pressure, said pitch exhibiting a five-second cone penetration at 0° C. not greater than 20.

2. An uncured ethylene-propylene terpolymer rubber composition according to claim 1 wherein the tall oil pitch contains at least 80%–90% of the non-volatile material and exhibits a cone penetration of about 15–18.

3. An uncured ethylene-propylene terpolymer rubber composition according to claim 2 wherein the tackifier is present in amounts of about 5% to 10% of the weight of the terpolymer rubber.

4. A tackifying composition for ethylene-propylene terpolymer rubber consisting essentially of a solution of about 10 to 60 parts by weight of a rubber processing oil and 90 to 40 parts of a tall oil pitch which contains at least 80% of material that is nonvolatile when heated at 275° C. under 0.5–1.0 mm. of mercury pressure and which exhibits a five-second cone penetration at 0° C. not greater than 20.

References Cited

UNITED STATES PATENTS

| | | | |
|---|---|---|---|
| 2,330,810 | 11/1950 | Christendon et al. | 260—97.7 |
| 3,220,966 | 11/1965 | Flanagan | 260—27 |
| 3,331,804 | 7/1967 | Fogiel | 260—27 |
| 3,402,140 | 9/1968 | Bickel et al. | 260—24 |

OTHER REFERENCES

Skeist, I "Handbook of Adhesives," 1962 (page 193 relied on).

Kirkothmer "Encyclopedia of Chemical Technology" pp. 575 and 576 relied on (1954) vol. 13.

HOSEA E. TAYLOR, Primary Examiner

W. E. PARKER, Assistant Examiner

U.S. Cl. X.R.

260—24, 897